CIRCULATING AIR DRYER

Original Filed May 18, 1970

FRANKLIN W. COOK
INVENTOR

BY Kolisch & Hartwell

ATTY.

United States Patent Office

Re. 28,226
Reissued Nov. 5, 1974

28,226

CIRCULATING AIR DRYER

Franklin W. Cook, Portland, Oreg., assignor to F. W. Cook & Associates, Inc., Portland, Oreg.

Original No. 3,659,352, dated May 2, 1972, Ser. No. 38,451, May 18, 1970. Application for reissue Nov. 26, 1973, Ser. No. 419,134
Int. Cl. F26b *21/06*
U.S. Cl. 34—191 5 Claims

Matter enclosed in heavy brackets [ ] appears in the original patent but forms no part of this reissue specification; matter printed in italics indicates the additions made by reissue.

ABSTRACT OF THE DISCLOSURE

A circulating air dryer including a chamber for holding articles to be dried, and a reversible, power-operated air mover for selectively moving air through the chamber in opposite directions. With the air mover operating in either of opposite directions, the dryer also includes means within the chamber for exhausting a portion of the air circulated upstream from the air mover, means for introducing heat to the air being circulated downstream from where the air is exhausted, and means for introducing make up air into the chamber between the exhaust means and the heating means.

BACKGROUND OF THE INVENTION

The present invention concerns an air circulation system for a dryer. More particularly, the invention concerns a reversible, heated air circulation system for a dryer that permits the air exhausted from the dryer during circulation, to be withdrawn when having a low temperature and a high relative humidity.

In drying materials, such as lumber, having a high moisture content it is necessary to expose the materials to a high heat environment in a dryer over a predetermined length of time. In the operation of dryers it is usual to circulate a volume of heated air over a course around the material to be dried, to remove moisture therefrom. For each material, such as a particular type of lumber, an empirically determined schedule can be followed that involves careful control of the volume of air circulated, the temperature of the air, and the relative humidity within the dryer. These factors are important since heat from the air is used to evaporate the moisture in the material and the volume of air circulated governs the amount of heat applied to the material.

As water evaporates from the material being dried a temperature drop occurs in the circulated air. Consequently, the temperature of the air entering the stacks of material to be dried is higher than the temperature of the air leaving the stacks. Furthermore, as the air passes over the material, the relative humidity of the air is increased by the moisture removed. Therefore, the material on the front side of a stack, which is initially contacted by the heated air, tends to dry faster than the material on the rear side of a stack.

Therefore, to promote even drying, it is usual to periodically reverse the flow of air through the stacks of material. It is also usual in air circulation systems for dryers continuously to withdraw a certain amount of the circulating air to remove moisture from the dryer, and to replenish the exhausted air with a fresh supply of makeup air of low relative humidity.

In the prior art, little regard has been given to the location of the inlet and exhaust ducts used for the above purpose. More particularly, it is common for the exhaust duct to be located downstream of the circulation fan and heater whereby the duct exhausts air from the dryer having a high temperature and a low relative humidity. In such systems, the amount of heat loss is significant. Furthermore, the withdrawal of air of low relative humidity tends to accentuate the loss since a larger volume of air must be exhausted to remove a given amount of moisture from the dryer.

Even in circulating air dryers that do not have unnecessary heat loss with air circulating in one direction, heat loss generally occurs when the direction of airflow is reversed.

The problems outlined above for dryers of all types occur particularly in closed, batch-type drying kilns of the type commonly used for drying cut lumber.

SUMMARY OF THE INVENTION

Accordingly, it is an object of the invention to provide an improved air circulation system for a dryer that overcomes the disadvantages of conventional systems.

It is another object of the invention to provide a heated air circulation system for a dryer that permits the air exhausted from the dryer to be withdrawn when having a low temperature and a high relative humidity.

It is a further object of the invention to provide a heated air circulation system for a dryer including a reversible power-operated air mover and heating means, and further including a first set of inlet and outlet ducts located rearwardly of the air mover and a second set of inlet and outlet ducts located forwardly of the air mover.

It is yet another object of the invention to provide a heated air circulation system especially adapted for use with a batch-type lumber kiln.

The above objects are attained by a heated air circulation system that includes a reversible, power-operated air mover located proximate a heater on a platform above the drying chamber of a dryer. First inlet and exhaust ducts are located on the rear side of the air mover and second inlet and outlet ducts are located on the forward side of the air power, adapted to communicate with the atmosphere. A louver is provided in each duct for opening and closing the duct an dat least one exhaust fan is provided to selectively exhaust air from the system.

With the air mover operating in a forward direction, air is admitted through the inlet duct on the rear side of the air mover and exhaust air is removed through the exhaust duct on the rear side of the air mover. With the air mover operating in the rearward direction inlet air is admitted through the inlet duct located on the forward side of the air mover and exhaust air is withdrawn by the exhaust fan through the exhaust duct located on the forward side of the air mover. With the air mover operating in either direction, the unused ducts are closed by the louvers. The location of the exhaust ducts permits air to be withdrawn after it has passed over the material being dried, and with such air at substantially the lowest dry-bulb temperature and substantially the highest relative humidity within the dryer. In an alternative embodiment of the dryer, the inlet ducts are supplied from a single inlet channel which is provided with an inlet fan. The exhaust ducts are also connected to a single outlet channel which is provided with an exhaust fan.

BRIEF DESCRIPTION OF THE DRAWINGS

Other objects and advantages of the invention will become apparent from the following detailed description taken in conjunction with the accompanying drawings, wherein.

DETAILED DESCRIPTION OF THE INVENTION

Figure 1:
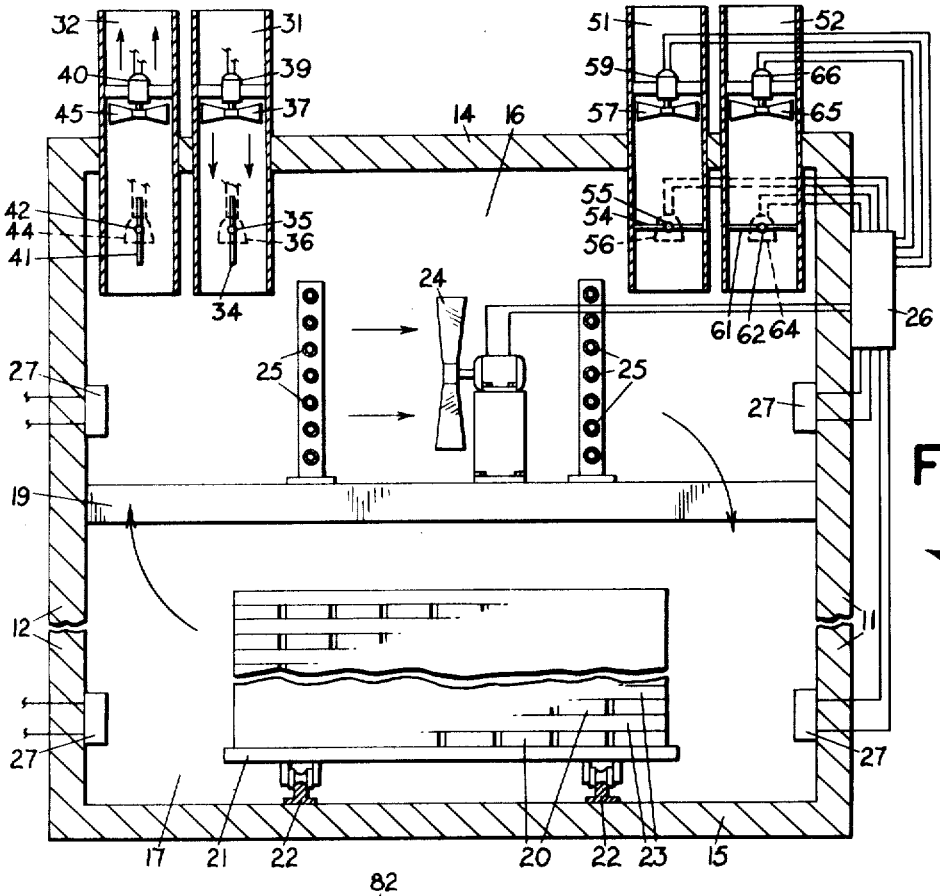
FIG. 1 is an end elevation view of a dryer constructed in accordance with the invention, with portions removed to disclose details of construction.

Referring now to the drawings, one preferred embodiment of the invention is described in connection with a dryer, such as a dry kiln 10 generally including sidewalls 11, 12, a top 14 and a floor 15. The kiln may be of any suitable length and is closed at the ends by doors, not shown, to define a closed space *or kiln chamber* wherein the atmosphere can be controlled. The kiln can be constructed of masonry or other suitable materials and can be insulated to reduce heat and vapor transmissions.

The kiln can be constructed of any desirable length, but it normally would be long enough to accommodate a number of stacks of material, such as lumber, for drying thereof.

It should be noted that the air circulation system described hereinafter also has utility when used with other types of dryers, such as continuous dryers, and when used for removing moisture from products other than lumber.

The kiln 10 is divided into an upper equipment [chamber] *compartment* 16 and a lower drying [chamber] *compartment* 17 by means of a platform 19 supported intermediate walls 11, 12 by suitable support members, not shown. The drying [chamber] *compartment* is sufficiently large to accommodate stacks of lumber 20 supported on cars such as that illustrated at 21, adapted to run on rails 22 set in the floor of the kiln. The lumber illustrated comprises cut members of standard size stacked with transverse spacers 23 therebetween to permit circulation of air throughout the stacks as indicated by the flow arrows. However, other arrangements of lumber can be used if desired.

An air mover, such as a fan 24 power operated by a reversible, variable speed motor is supported in an upright position on platform 19. The fan is positioned selectively to force air in a forward direction towards sidewall 12 and in a rearward direction towards sidewall 11.

It should be realized that a number of such fans can be provided, spaced at intervals along the length of the kiln to provide the desired amount of air circulation. Likewise, a plurality of fans could be provided, adapted for operation from a single shaft.

Positioned on the forward and rearward sides of each fan are suitable heating means such as coils 25 adapted to carry steam or hot water from a suitable source, not shown. The heating coils are adapted to heat air forced through the fan in either direction. Alternatively, electrical heating coils or other suitable heating means can be utilized.

The fan motor is energized from a control panel 26 and can be automatically or manually controlled to regulate the speed and direction of fan movement in a conventional manner. A plurality of sensing instruments 27 also of conventional design are positioned at various locations within the kiln. These instruments are electrically connected with control panel 26, as shown, and serve to monitor the dry-bulb temperature and the wet-bulb temperature of relative humidity of the atmosphere within the chamber.

Located at the top of the equipment [chamber] *compartment* on the forward side of [each] *the* fan (*the left side as illustrated in FIG. 1*) are an inlet duct 31 and an exhaust duct 32, adapted to communicate between the interior of the kiln and the atmosphere. The ducts can be any suitable configuration and are shown only for purpose of illustration as straight channels of circular cross section. A louver 34 is pivotally mounted on a shaft 35 extending across inlet duct 31. The louver is shown in an open position but can be moved, by means of motor 36 shown in dotted outline, to a closed position. An inlet fan 37 is mounted in the upper portion of duct 31, adapted to be driven by a motor 39. Motor 39 is selectively energized from control panel 26, and is adapted to drive the fan at variable speeds. Fan 37 is not an essential component of the air circulation system described, but is useful to control the temperature and humidity within the drying chamber.

Exhaust duct 32 is of similar construction, including a louver 41 mounted on shaft 42 for movement by motor 44 between open and closed positions. An exhaust fan 45 is similarly supported in the exhaust duct, adapted to be driven at a variable speed by a motor 46, also selectively energized from control panel 26. The exhaust fan is an essential element of the air circulation system since the exhause duct extends into a negative pressure area of the circulation fan, when the latter is operating to force air in a rearward direction, *or to the right in FIG. 1.*

On the rearward side of the circulation fan a second inlet duct 51 and a second exhaust duct 52 are provided, communicating between the [drying chamber] *interior of the kiln* and the atmosphere. Inlet duct 51 includes a louver 54 supported on shaft 55 for movement between open and closed positions. The position of the louver is controlled by motor 56, selectively energized from control panel 26. An inlet fan 57 is mounted in the upper portion of the inlet duct, adapted to be driven at a variable speed by motor 59 also energized from control panel 26.

Exhaust duct 52 includes a louver 61 supported on a shaft 62 for movement between open and closed positions under the control of motor 64. In similar fashion, a second exhaust fan 65 is provided in the upper portion of the exhaust duct, adapted to be driven at a variable speed by motor 66 when the latter is energized from control panel 26.

Control panel 26 is a conventional type control unit and can be utilized for manually or automatically controlling the environment of the kiln according to a predetermined schedule.

With the kiln loaded and closed, and fan 24 operating to force air in a rearward direction, as shown by the arrows, ducts 31 and 32 are maintained open and ducts 51, 52 are closed. Heat is supplied from coils 25 to raise the dry-bulb temperature [within] *of air entering* the drying [chamber] *compartment* to a predetermined level and the humidity [within the chamber] *of such air* is controlled at a predetermined level, if necessary through addition of moisture by conventional means, not shown. The speed of the circulation fan is regulated to achieve the desired airflow as determined from an empirical schedule for the particular batch of lumber being processed. It should be apparent that with air circulating in the direction shown, the air entering the lumber stack is at a high temperature and low relative humidity with respect to the air leaving the stack. Consequently, the air withdrawn from the [drying] *kiln* chamber by exhaust fan 45 is at substantially the lowest dry-bulb temperature within the *kiln* chamber and of substantially the highest relative humidity. Therefore, the heat lost in the exhausted air is minimized and a larger amount of moisture can be removed. The location of the inlet duct serves to provide an adequate supply of fresh air in front of the heater and circulation fan where it is most efficiently handled. Although the louvers 34, 41 are shown in a fully opened position, it should be realized that they can be independently controlled and either louver can be partially closed to regulate the airflow, dry-bulb temperature and relative humidity within the drying [chamber] *compartment* to the desired level.

With fan 24 operating in a forward direction, ducts 31, 32 are closed and ducts 51, 52 are opened. In that event, exhaust air is withdrawn from the [drying] *kiln* chamber by exhaust fan 65 and fresh air is added to the system through the inlet duct 51 by fan 57. It should be apparent that the exhausted air is still at substantially the lowest dry-bulb temperature and substantially the highest relative humidity within the [drying] *kiln* chamber. Likewise, the fresh air being admitted is provided directly to the fan and heaters for efficient handling.

The positioning of the ducts as shown in FIG. 1 is only diagrammatic in nature, it being understood that the exact locations of the regions of lowest temperature and highest relative humidity within any dryer can be determined by measure. However, the locations of these regions will be generally at the points illustrated in FIG. 1 for the reasons previously set forth.

Figure 2:
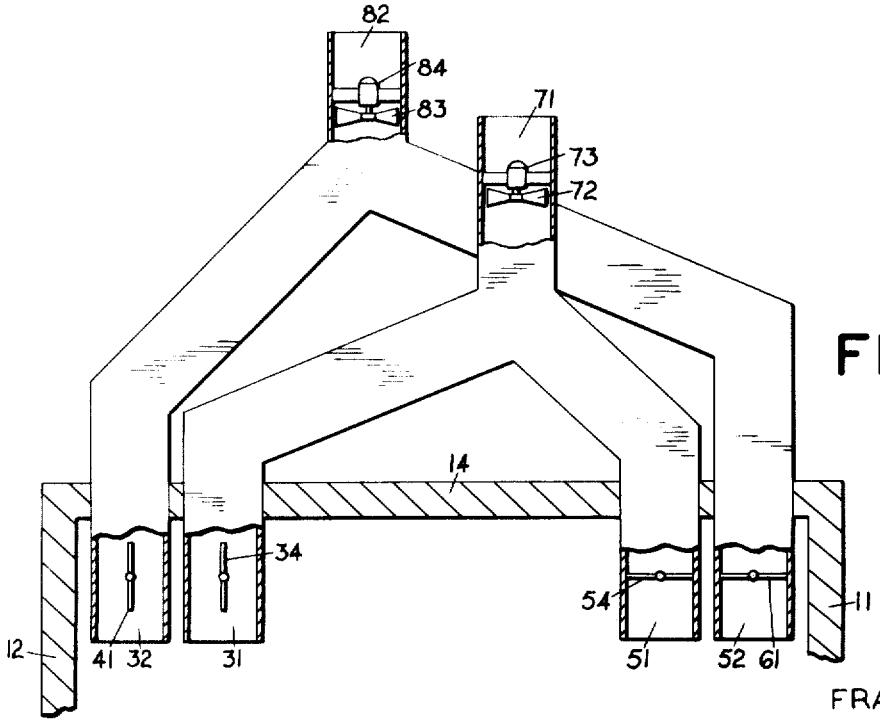
FIG. 2 is a partial end elevation view of an alternative embodiment of a dryer also constructed in accordance with the invention.

Referring now to FIG. 2, an alternative embodiment of the air circulation system is illustrated wherein the inlet ducts are both connected to a single inlet channel and the outlet ducts are both connected to a single outlet channel. This is possible since the inlet ducts and exhaust ducts are used alternately. In FIG. 2, like elements of FIG. 1 are designated by like numerals.

Inlet duct 31 and inlet duct 51 are both connected to an inlet channel 71 having an inlet fan 72 supported therein, adapted to be driven at a variable speed by motor 73. Motor 73 is energized from control panel 26. In similar fashion, exhaust duct 32 and exhaust duct 52 are both connected to an exhaust channel 82 having an exhaust fan 83 supported therein, adapted for variable speed rotation by motor 84. Motor 84 is energized from control panel 26. The inlet ducts and outlet ducts are provided with louvers in the same manner as the apparatus of FIG. 1.

The inlet and exhaust ducts illustrated in FIG. 2 are controlled in substantially the same manner as the corresponding elements in FIG. 1. However, it should be apparent that the embodiment of FIG. 2 is an improvement in the sense that it includes only a single exhaust fan and a single inlet fan. As in the embodiment of FIG. 1, the inlet fan is not an essential item but is included to facilitate control of the circulation of air through the system.

It is claimed and desired to secure by Letters Patent:

[1. A circulating air dryer including a chamber for holding materials to be dried; a reversible power-operated air mover for selectively circulating air through said chamber in either of opposite direction; exhaust means communicating with the chamber for exhausting a portion of the air being circulated, said exhaust means withdrawing air at a location disposed upstream of the air mover and in a region under negative pressure with respect to the air mover with the air mover operating in either of opposite directions, means for introducing heat to the circulating air disposed downstream of the exhaust means with the air mover operating in either of opposite directions; and means for introducing makeup air into the chamber downstream of the exhaust means with the air mover operating in either of the opposite directions.]

[2. A system for circulating air within a space comprising a reversible air mover in said space for selectively forcing air along a course through the space in either of opposite directions, heating means disposed proximate said air mover for selectively introducing heat to air forced through the air mover, first air transfer means communicating between the atmosphere and a region of said space disposed on one side of the air mover which region is at a negative pressure with respect to the air mover with the air mover forcing air in one direction, said air transfer means including an inlet for admitting fresh air to said space for heating and an exhaust including means for exhausting cooled air at the region of negative pressure relative to said air mover from said space, and second air transfer means communicating between the atmosphere and a region of said space disposed on the other side of said air mover which region is at a negative pressure with respect to the air mover with said air mover forcing air in the other direction, said air transfer means including an inlet for admitting fresh air to said space for heating and an exhaust including means for exhausting cooled air at the region of negative pressure relative to said air mover from said space.]

[3. A system as described in claim 2, wherein:

each air transfer means includes an inlet duct and an outlet duct, a louver in each said duct for opening and closing the duct, motor means associated with each louver for controlling said louver, and an exhaust fan associated with the outlet duct.]

[4. A system as described in claim 3 further including an inlet fan associated with each inlet duct.]

[5. A system as described in claim 4, wherein said air mover comprises a fan power operated by a reversible, variable speed motor and wherein said inlet fans and said exhaust fans are variable-speed units.]

[6. A system as described in claim 3, wherein each inlet duct is located between the exhaust duct associated therewith and the air mover.

[7. A system as described in claim 6, wherein each exhaust duct is located at a region of the space exposed to air having substantially the lowest dry-bulb temperature and substantially the highest relative humidity within the space.]

[8. A system as described in claim 3 further including instrument means in said space for sensing the dry-bulb temperature and the relative humidity for controlling said motor means.]

9. A system for circulating heated air within a closed lumber kiln comprising a reversible circulating fan in said kiln for selectively forcing air *passing through the fan either* forwardly of the fan [and] *or* rearwardly of the fan along a course surrounding a stack of lumber within the kiln, a heater disposed proximate said circulating fan for adding heat to the air [forced] *passing* through the circulating fan, air inlet means for admitting air from the atmosphere to said kiln, including a first inlet duct located in a region of said kiln rearward of said circulating fan and a second inlet duct located in a region forward of said circulating fan, louver means in each inlet duct for opening and closing the duct, and motor means associated with each louver means for positioning said louver means, and air exhaust means for exhausting air from said kiln to the atmosphere with said air being at substantially the lowest dry-bulb temperature and the highest relative humidity within the kiln, including a first exhaust duct located in a region of said kiln rearward of said circulating fan and a second exhaust duct located in a region of said kiln forward of said circulating fan, louver means in each exhaust duct for opening and closing the duct, motor means associated with each louver means for positioning said louver means, and exhaust fan means for selectively exhausting air from a region of negative pressure in said kiln relative to said circulating fan through said first exhaust duct and said second exhaust duct, when opened.

*10. A circulating air dryer including a chamber having a space for holding materials to be dried,*

*a reversible power-operated air mover for selectively circulating air through said space in either of opposite directions with such air moving from the exhaust side of the mover into and through said space and thence to a negative pressure area on the suction side of the mover,*

*one exhaust port connecting with the atmosphere and communicating with said chamber at one region which is on the suction side of the mover and at negative pressure with the mover circulating air in one direction through said space, and another exhaust port also connecting with the atmosphere and communicating with said chamber at another region which is on the suction side of said air mover and at*

*negative pressure with the mover circulating air in the opposite direction through said space,*

*selectively operable power-operated fan means for producing an exhaust flow of air from said one region of the chamber to said atmosphere through said one exhaust port when said one region is at negative pressure and movement of air is in said one direction and for producing an exhaust flow of aid from said other region of the chamber to said atmosphere through said other exhaust port when said other region is at negative pressure and movement of air is in said other direction, and*

*means for introducing makeup air and means for introducing heat to the circulating air after such circulating air passes the region where exhaust flow is taking place and before such air enters into said space with air being circulated in either of opposite directions through said space.*

*11. The circulating air dryer of claim 10, wherein the means for introducing heat to the circulating air comprises first and second heaters disposed on opposite sides, respectively, of said air mover, and the means for introducing makeup air with air circulating in said one direction comprises one inlet duct made operable with circulation in said one direction and communicating with said chamber intermediate the said one exhaust port and the heater on the suction side of said air mover with air circulating in said one direction, and another inlet duct made operable with circulation in said other direction and communicating with said chamber intermediate the said other exhaust port and the heater on the suction side of said mover with air circulation in said other direction.*

*12. The dryer of claim 11, wherein said one and said other inlet ducts are provided with power-operated fan means for regulating air flow therethrough.*

*13. A circulating air dryer as claimed in claim 10, wherein said air mover comprises a fan power operated by a reversible variable speed motor, and wherein said power-operated fan means for producing an exhaust flow of air comprises a variable speed fan producing exhaust flow of air through the said one exhaust port and another variable speed fan producing an exhaust flow of air through said other exhaust port.*

References Cited

The following references, cited by the Examiner, are of record in the patented file of this patent or the original patent.

UNITED STATES PATENTS

| | | | |
|---|---|---|---|
| 840,037 | 1/1907 | Barney | 34—223 |
| 3,259,995 | 7/1966 | Powischill | 34—54 |
| 2,728,148 | 12/1955 | Stewart | 34—213 |
| 3,131,034 | 4/1964 | Marsh | 34—191 |
| 2,347,601 | 4/1944 | Jackson | 34—191 |

FOREIGN PATENTS

| | | | |
|---|---|---|---|
| 31,056 | 8/1926 | France | 34—191 |
| 554,996 | 3/1923 | France | 34—191 |

KENNETH W. SPRAGUE, Primary Examiner

J. C. YEUNG, Assistant Examiner